(No Model.)
J. W. ANDERSON.
AXLE SKEIN.
No. 290,511.  Patented Dec. 18, 1883.
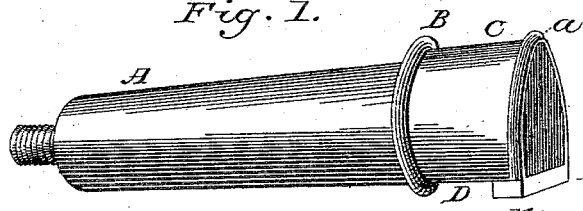
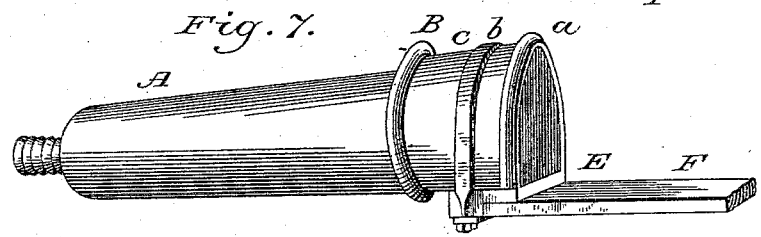
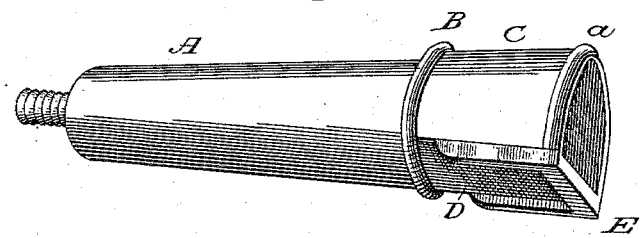
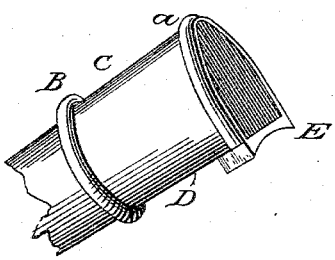
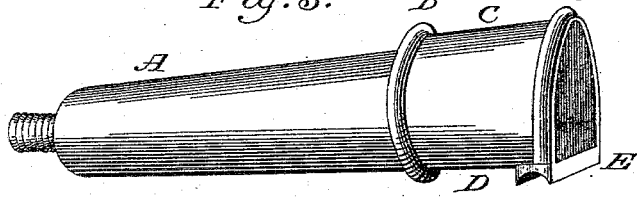
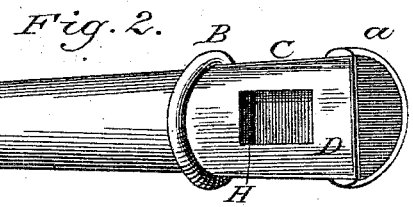
Witnesses:
Wm. L. Bush
Paul Anderson
Inventor:
John W. Anderson

UNITED STATES PATENT OFFICE.

JOHN W. ANDERSON, OF SOUTH BEND, INDIANA.

AXLE-SKEIN.

SPECIFICATION forming part of Letters Patent No. 290,511, dated December 18, 1883.

Application filed February 1, 1883. (No model.)

*To all whom it may concern:*

Be it known that I, JOHN W. ANDERSON, a citizen of the United States, residing at South Bend, in the county of St. Joseph and State of Indiana, have invented new and useful Improvements in Wagon-Axle Skeins, of which the following is a specification.

My invention relates to improvements in wagon-axle skeins of the class commonly known as "thimble-skeins;" and the objects of my improvements are casting the skein of suitable shape to provide a substantial shoulder or abutment to take the strain of a plate or truss-bar on the lower side of the axle, and to strengthen the socket of the skein on the bottom side, and combining simplicity, strength, and fitness for the purposes intended. I attain these objects by constructing a skein of the form illustrated in the accompanying drawings, in which—

Figure 1 is a perspective view showing transverse rib. Fig. 2 is a view showing recess in bottom of socket. Fig. 3 is a view showing variation in shape of cross-rib. Fig. 4 is a view showing another variation in shape of cross-rib. Fig. 5 is a view showing longitudinal ribs on flat bottom. Fig. 6 is a view of a portion of truss-bar. Fig. 7 is a view showing skein with truss-bar clipped on.

Similar letters refer to similar parts throughout the several views.

My thimble-skein is composed of the usual parts, viz: spindle A, collar B, and enlarged socket C back of the collar. In my skein the lower portion of the outside of the socket C is flat, or substantially so, instead of round or oval, as usually made. Near the end of the socket C, and running crosswise of the flattened bottom D, is a rib, E. The rib E has an angular edge toward the collar B. The rib E is preferably connected with the bead *a*, thus making the lower side of the socket as strong as any other portion of it. The outward edge of the rib E, being angular in shape, provides a shoulder or abutment, which is adapted to receive the strain of a truss-bar, F, when required. The shape of one end of the truss-bar is shown in Fig. 6. I also construct the skein with a recess or mortise in the lower flattened portion, as shown at H, Fig. 2. The recess H forms an abutment for the truss F, and is equivalent to the raised cross-rib E.

The rib E may have a concave surface, as shown at Figs. 3 and 4.

At Fig. 7 one end of the truss-bar is shown secured to the skein by the clip *b*.

The skein may have a longitudinal rib on each side of the flattened bottom, as shown at Fig. 5, which forms a channel for the truss-bar. The shape of the bottom of the skein may be varied somewhat from that here described without departing from the spirit of my invention.

I am aware that wagon-axle skeins have been constructed with a flat bottom, and with a flat bottom in combination with downward-projecting lugs and hooks, for the purpose of securing a truss-bar to strengthen the axle; but they are without any cross-rib, and consequently leave a weak place in the skein on the lower side.

I do not make a broad claim to a skein with a flat bottom; but

What I do claim as my invention, and desire to secure by Letters Patent, is—

1. A wagon-axle skein having a transverse rib, E, back of the collar B, adapted to form an abutment for the shoulder of a truss-bar, F, and a truss-bar, F, having a shoulder adapted to abut against the rib E, constructed substantially as and for the purposes set forth.

2. As a new article of manufacture, the axle-skein having flat bottom D back of the collar B, in combination with the transverse rib E, having a flat or concave side toward the collar B, arranged to form an abutment for the shoulder of a truss-bar, F, constructed substantially as described.

JOHN W. ANDERSON.

Witnesses:
W. L. BUSH,
PAUL ANDERSON.